United States Patent [19]

Lichte

[11] 4,054,772

[45] Oct. 18, 1977

[54] POSITIONING SYSTEM FOR ROCK BIT WELDING

[75] Inventor: Carl Laurent Lichte, Dallas, Tex.

[73] Assignee: Dresser Industries, Inc., Dallas, Tex.

[21] Appl. No.: 574,228

[22] Filed: May 5, 1975

Related U.S. Application Data

[63] Continuation-in-part of Ser. No. 409,209, Oct. 24, 1973, abandoned.

[51] Int. Cl.² .............................................. B23K 9/00
[52] U.S. Cl. ............................. 219/121 EM; 175/375;
219/121 LM; 76/108 R; 76/108 A; 228/212;
228/186; 269/63; 279/5
[58] Field of Search ................ 219/121 EB, 121 EM,
219/121 P, 121 L, 121 LM; 269/63, 71;
279/1.5, 5, 110, 112; 76/108 R, 108 A; 228/182,
196, 212, 192; 173/375, 411

[56] References Cited

U.S. PATENT DOCUMENTS

| | | | |
|---|---|---|---|
| 2,225,273 | 12/1940 | Jacobs | 279/112 X |
| 2,831,661 | 4/1958 | Brown | 175/340 |
| 2,901,223 | 8/1959 | Scott | 175/340 X |
| 2,925,659 | 2/1960 | Lovely | 33/168 R |
| 3,148,873 | 9/1964 | Chandler | 269/71 |
| 3,440,392 | 4/1969 | Erlandson et al. | 219/121 EB X |
| 3,535,487 | 10/1970 | Hinrichs et al. | 219/121 EB |
| 3,592,995 | 7/1971 | Hinrichs | 219/121 EB |
| 3,742,365 | 6/1973 | Sciaky | 219/121 EB |
| 3,850,256 | 11/1974 | McQueen | 175/375 |

Primary Examiner—J. V. Truhe
Assistant Examiner—Mark H. Paschall
Attorney, Agent, or Firm—Eddie E. Scott

[57] ABSTRACT

A positioning system is provided for clamping individual segments of a rock bit together in position for an assembled bit and aligning the seams between the segments with a beam of energy from a welding gun. The segments are moved until the plane of a first seam between segments is coincident with the plane of the beam. Relative movement between the segments and the beam causes the beam to traverse the first seam throughout the plane of the seam and fuse the segments together. The segments are indexed by the fixture to bring the second seam into a position coincident with the plane of the beam. Relative movement between the segments and the beam causes the beam to traverse the second seam throughout the plane of the seam and fuse the segments together. The steps are repeated until the bit is completed.

7 Claims, 6 Drawing Figures

4,054,772

POSITIONING SYSTEM FOR ROCK BIT WELDING

CROSS REFERENCE TO RELATED APPLICATIONS

This is a continuation-in-part of the U.S. application Ser. No. 409,209, filed Oct. 24, 1973 for POSITIONING FIXTURE FOR ROCK BIT WELDING, now abandoned. Applicant in this application is also the applicant in the following applications:

U.S. application Ser. No. 581,997, filed May 29, 1975 for POSITIONING FIXTURE FOR ROCK BIT WELDING, said application being a continuation of U.S. application Ser. No. 409,209, filed Oct. 24, 1973, now abandoned;

U.S. application Ser. No. 564,014, filed Apr. 1, 1975 for UNITIZED ROTARY ROCK BIT, said application being a division of U.S. application Ser. No. 409,207, filed Oct. 24, 1973, now abandoned;

U.S. application Ser. No. 577,828, filed May 15, 1975, now U.S. Pat. No. 3,987,859. for UNITIZED ROTARY ROCK BIT, said application being a continuation of U.S. application Ser. No. 409,207, filed Oct. 24, 1973, now abandoned; and U.S. application Ser. No. 409,208, filed Oct. 24, 1973, now U.S. Pat. No. 3,907,191 for A METHOD OF CONSTRUCTING A ROTARY ROCK BIT.

BACKGROUND OF THE INVENTION

The present invention relates to the earth boring art and more particularly to a welding system for welding a multiplicity of individual segments together to form a rock bit.

A rotary rock bit in general consists of a main bit body adapted to be connected to a rotary drill string. Cutter means connected to the main bit body contact the formation during the drilling operation to form the desired borehole. The present invention provides a positioning fixture for clamping individual segments of the bit body together in the proper position for the final assembled bit and aligning the seams between segments with a beam of energy from a welding gun. Relatative movement between the segments and the beam causes the beam to traverse the seams in the plane of the seams and fuse the segments together.

The rotary rock bit must operate under extremely harsh environmental conditions and must effectively disintegrate very hard formations to produce the desired borehole. The gage size of the bits must be precise. Variation in the gage size of bits has been a problem in the prior art. In some operations the bit must pass through casing with a minimum clearance. In other operations it is necessary for the bit to pass through bored and still open holes which may be within a few thousandths of an inch of the gage size of the bit. If the gage size of the bits varies during the manufacturing process, the bits will encounter problems during the drilling operation.

The prior art methods of manufacturing rotary rock bits require the use of shims to size the bits to the proper gage size. The present invention allows the bits to be manufactured with an accurate and uniform gage size without the use of shims. During the construction of a prior art rotary rock bit a substantial amount of heat was generated when the separate segments of the bit were welded together. It was necessary to cool the bits to prevent tempering of steel components and heat damage to rubber components. The excessive heat could result in a change in temper of the metal of the rock bit, thereby creating the danger of a premature failure of the metal during the drilling operation. Since the rock bit often includes rubber or synthetic parts, any excessive heating in the vicinity of said parts could cause a weakening or destruction of said parts. It was necessary to use dowels between the segments of prior art bits to maintain the segments in the proper relationship during the welding operation.

The prior art method of manufacturing rotary rock bits consists of forming a weld groove between adjacent segments of the bit and filling the weld groove with a weld deposit by a welding process. Surfaces on adjoining segments are in adjacent relationship but the surfaces are not joined together and the joining of the segments is through the weld deposit. The cross sectional shape of the prior art weld was an irregular many sided polygon. An excessive amount of weld deposit was produced during the welding of prior art bits and the excessive amount of weld deposit would often result in warpage of the bit body. The excessive weld deposit also created the danger of the lubrication system and the bearing systems being contaminated during the manufacturing process by debris from the welding process. The weld deposit is not as hard as the body segments, thereby creating fatigue problems.

When the individual segments of the bit body are to be joined together, they must be accurately positioned during the welding process. If the individual segments are not properly positioned, the gage size of the bit will not be accurate. The prior art bits were checked for proper gage size by two ring gauges. If the gage size fell between the maximum ring gauge and the minimum ring gauge, the bit was considered satisfactory. It will be appreciated that such prior art bits would not have uniformly precise gage sizes. When a beam of energy is used to join the individual segments of the bit, the individual segments must be accurately aligned with the beam during the welding process. The joining of the individual segments of the bit body together in accordance with the present invention insures that the gage size of the bit will be uniformly accurate.

An illustration of the problems created with prior art manufacturing processes will be presented with reference to a rotary cone rock bit. A rotary cone rock bit includes at least one rotatable cutter mounted on a bearing pin extending from the main bit body. Bearings are provided between the cutter and the bearing pin to promote rotation of the cutter and means are provided on the outer surface of the cutter for disintegrating the formations as the bit and cutter rotate and move through the formation. A sufficient supply of lubricant must be provided to the bearings throughout the lifetime of the bit. The lubricant is maintained within the bearing area by a flexible rubber seal between the cutter and the bearing pin. Any excessive heating of the bit will damage the rubber seal and/or the lubricant. If the bit body is not constructed to a precise gage size, the bits will encounter difficulties when they are moved through casing having a minimum clearance or through a borehole with minimum clearance. Excessive weld deposits may result in warpage of the bit and a resulting inaccurate gage size.

DESCRIPTION OF PRIOR ART

In U.S. Pat. No. 2,807,444 to W. H. Reifschneider, patented Sept. 24, 1957, a rotary earth boring drill is shown and claimed in which the bit head is formed of a plurality of arcuate segments, each of said segments being asymmetric and comprising a body portion having a downwardly extending leg and a downwardly extending hollow boss in side-by-side relation thereon, there being a passage communicating between the interior of the bit head and the bores of the bosses.

In U.S. Pat. No. 2,831,661 to G. R. Brown, patented Apr. 22, 1958, a drill bit consisting of three segmental elements which are adapted to fit together to constitute a bit is shown. After forging, the segmental elements are machined to afford accurately meeting surfaces when the elements are assembled together. The margins which represent the meeting of the segments are given a chamfer for providing a weld groove. The three segmental elements are assembled in a jig and welding is carried out along the groove.

In U.S. Pat. No. 2,778,926 to W. H. Schneider, patented Jan. 22, 1957, a method for welding and soldering by bombarding by electrons the engaging surfaces of two parts to be connected is shown. The method disclosed shows a system for soldering, welding, or sintering suitable materials by heating the parts to be connected with a beam of electrons.

Summary of the Invention

The present invention provides a positioning system for clamping individual segments of a rock bit together in the proper position for the final assembled bit and aligning the seams between segments with a beam of energy from a welding gun to fuse the segments together. The gage cutting surfaces are held in the proper position for an accurate gage diameter bit. Relative movement between the segments and the beam causes the beam to traverse the seam in the plane of the seam and fuse the segments together. Adjustable means for clamping the segments together, means for insuring that the gage diameter of the bit is precisely the desired gage diameter, means for placing the segments in a position wherein the beam will be aligned with the first seam and means for indexing the segments to bring additional seams into alignment with the beam are provided. Initially, the gage cutting surfaces are moved to the precise desired gage diameter. This may result in the seams between segments becoming skewed relative to the bit axis. In order to insure that the beam will properly traverse the seams throughout the planes of the seams the plane of a first seam is moved to a position wherein it will be aligned with the plane of the beam. The beam fuses the segments together in the plane of the first seam. The segments are indexed to bring a second seam into alignment with the beam. The beam fuses the segments together in the plane of the second seam. Additional indexing and fusing repeats the steps to complete the bit. The above and other features and advantages of the present invention will become apparent upon consideration of the following detailed description of the invention when taken in conjunction with the accompanying drawings.

DETAILED DESCRIPTION OF THE INVENTION

Figure 1:
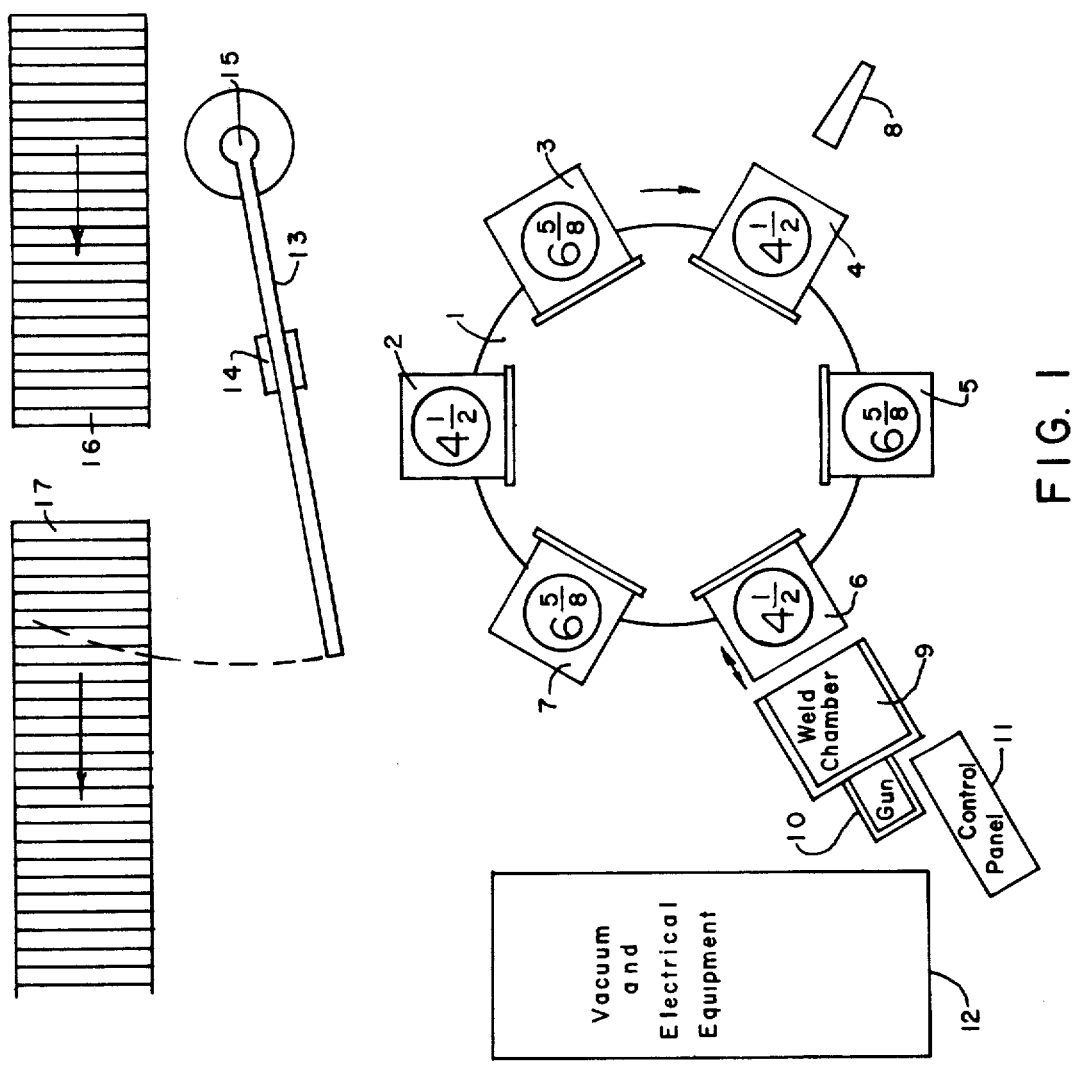
FIG. 1 is a schematic illustration of a welding system constructed in accordance with the present invention.

Referring now to FIG. 1, a schematic illustration of a welding system incorporating the present invention is shown. A dial feed type rotatable table 1 contains six positioning fixtures. The table 1 rotates the fixtures through three individual operating stations. The six positioning fixtures are divided into two sets of three fixtures each and each set of three fixtures is adapted to be sequentially rotated through the three operating stations. Fixtures 2, 4, and 6 at alternate locations may be adapted to receive bits with 4½ inches API regular pin connections and fixtures, 3, 5, and 7 at alternate locations may contain bits with 6⅝ inches API regular pin connections. The dial feed 1 will normally index 120° to move a particular fixture through the three operating stations. The individual segments that are to be positioned together to make up a rock bit are brought in on conveyor 16. The segments are moved from the conveyor 16 to the assembly station. Fixture 2 is shown at the assembly station in FIG. 1. A hoist may be used to lift the segments to the assembly station. The hoist 14 travels along arm 13 and arm 13 is adapted to pivot about rotatable element 15.

The segments are loaded in the fixture and positioned at the desired gage diameter with the seams in alignment for welding. For example, the segments for one bit will be assembled on fixture 2 in the proper positions for the final assembled bit. The dial feed 1 will be rotated 120° to bring fixture 2 to the verification station. Fixture 4 is shown at the verification station in FIG. 1. A jig transit 8 is used to insure that the segments are properly positioned for the welding operation. The dial feed 1 is again rotated 120° to bring the fixture to the welding station. Fixture 6 is shown at the welding station in FIG. 1. The fixture is moved into the weld chamber 9. When the fixture is moved into the weld chamber 9, the weld chamber 9 is completely closed and sealed. The weld chamber 9 is then evacuated for the welding process. The welding gun 10 is an electron beam gun that produces a beam of high intensity electrons. The beam has a high intensity (10 KW/mm$^2$) and a high power capacity (60 KW). The operation may be controlled from a control panel 11. The vacuum and electrical equipment are located in panel 12. After the welding has been completed, the chamber vented and the fixture moved back to the dial feed, the dial feed 1 is indexed 120° bringing the final assembled bit back to the assembly station. The assembled bit is removed from the station and placed on conveyor 17 to be prepared for shipment. The hoist 14 may be used when unloading the assembled bit.

Figure 2:
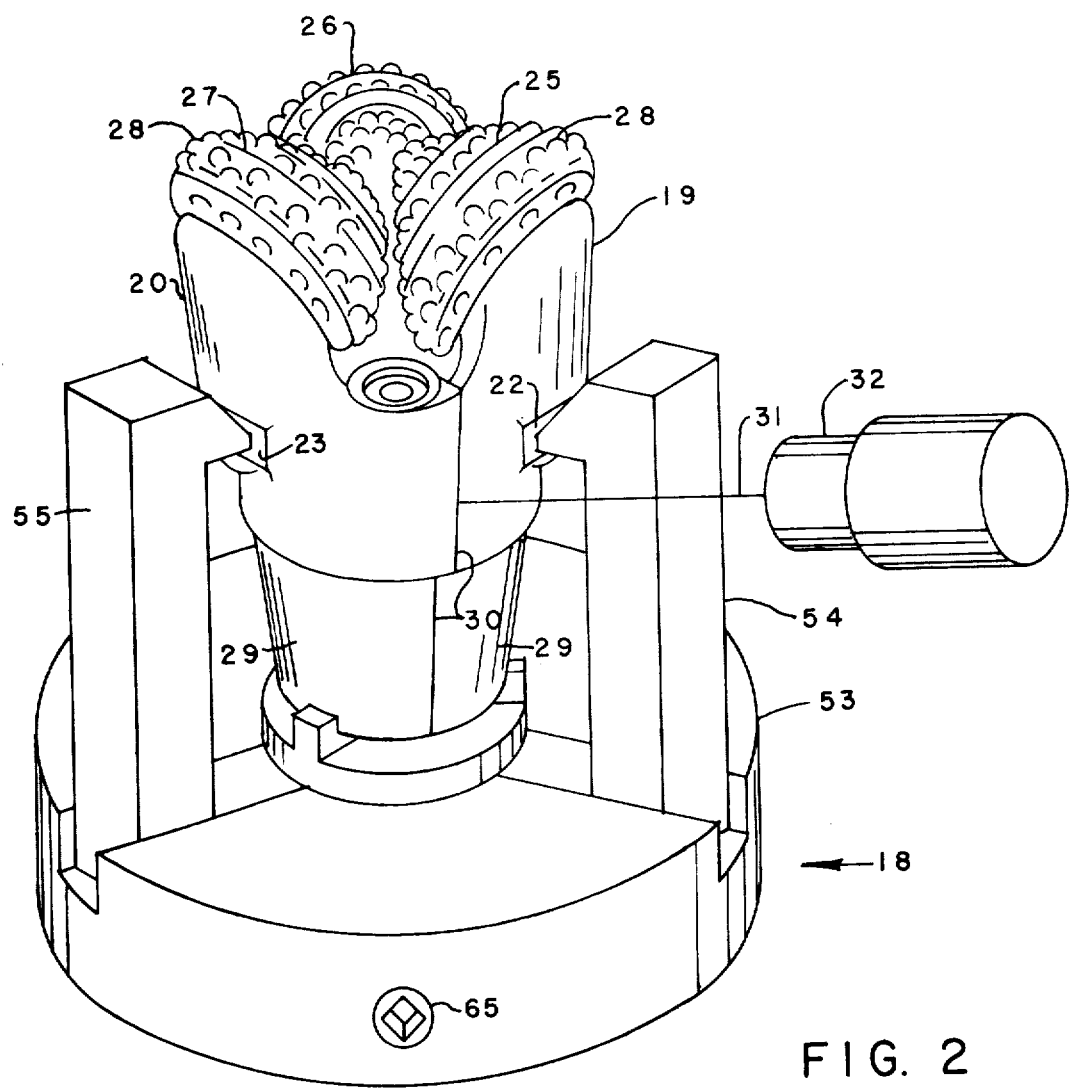
FIG. 2 shows three individual segments of a rotary rock bit positioned together for welding.

Referring now to FIG. 2, the upper portion of a positioning fixture constructed in accordance with the present invention is shown with three separate segments of a rotary rock bit positioned in the fixture. The fixture 18 will be located on the dial feed 1. The three segments 19, 20 and 21 (segment 21 being located behind segments 19 and 20 in FIG. 2) are positioned together and aligned in the proper position for the final bit. Chuck jaws 54, 55 and 56 (chuck jaw 56 being located behind segments 19 and 20 in FIG. 2) clamp the segments 19, 20 and 21 in the proper position for the final bit. Rotation of screw 65 will cause the chuck jaws 54, 55 and 56 to adjust the position of the segments. The chuck jaws 54, 55 and 56 and screw 65 are part of a clamp unit 53. The clamp unit 53 is a three jaw scroll chuck. For example, the clamp unit 53 may be a 15 inch steel body scroll chuck, size 15, part No. 36315 shown on page 65 of catalog #64 and manufactured by Union Chuck Division, Union Manufacturing Co., New Britain, Conn.

The segments 19, 20 and 21 include rotatable cone cutters 25, 26 and 27 that contain a multiplicity of tungsten carbide inserts 28 adapted to contact and disintegrate formations and form a borehole. The pin ends 29 of the segments are positioned on keys on the clamp unit 53. The abutting faces that form the seams are in sliding relationship to one another. The chuck jaws 54, 55 and 56 contact flats 22, 23 and 24 on the segments 19, 20 and 21, respectively, to force the segments 19, 20 and 21 together. The faces slide relative to one another to bring the gage inserts on the cutters into contact with a ring gauge. The final bit will therefore have an accurate gage size. The prior art bits were positioned together and checked with a pair of ring gauges to insure that their gage diameter fell between the two ring gauges.

An electron beam 31 from the electron beam gun 32 will traverse the seam 30 between segments 19 and 20 in the plane of the seam 30 to weld segments 19 and 20 together. The fixture 18 will rotate to index the next seam between segments 20 and 21 into alignment with the electron beam 31. The electron beam 31 is then caused to traverse the seam between the segments 20 and 21 to fuse segments 20 and 21 together. The positioning fixture is rotated 120° to index the next seam between the segments 19 and 21 into alignment with the electron beam 31. Relative movement between the segments and the electron beam 31 will cause the electron beam to traverse the seam in the plane of the seam to weld segments 19 and 21 together. Because of the high intensity of the electron beam (10 KW/mm$^2$) and its high power capacity (60 KW) the width of the area acted on between the segments is much narrower than that found in prior art rock bits. In addition, the electron beam gun produces a beam that penetrates substantially through the area to be joined. The energy from the electron beam is applied rapidly, thereby preventing heat buildup and reducing the danger of damaging the portions of the rock bit that have a low tolerance to heat such as the rubber seal and the lubricant. The segments 19, 20 and 21 of the rock bit fit together to form a square-butt type joint rather than the V-groove or the J-groove joints that were required in prior art rotary rock bits. The electron beam does not add material to produce a buildup of deposit along the seams and there is vary little if any warpage.

Figure 3:
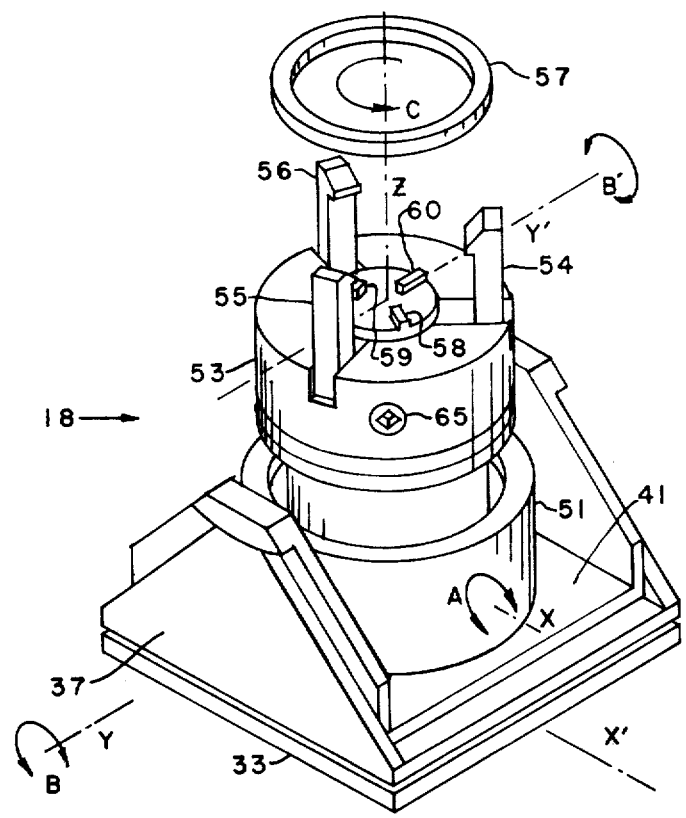
FIG. 3 shows a positioning fixture constructed in accordance with the present invention.

Referring now to FIG. 3, the positioning fixture 18 is shown. The fixture base 33 is mounted on the dial feed 1. The fixture base 33 is adapted to move radially on dial feed 1 along the Y axis into the weld chamber 9. Once the positioning fixture 18 is in the weld chamber the clamped segments 19, 20 and 21 are sequentially indexed into positions wherein the seams between segments are in alignment with the beam from the electron beam gun to weld the segments together. A swing support 37 is mounted on the fixture base 33. The swing support 37 is movable along the X' axis to move the plane of the seam coincident with the plane of the beam. A swing 41 is mounted on the swing support 37. The swing 41 provides rotational adjustment B'. The rotational adjustment B' in combination with rotation of the clamped segments provides alignment of the plane of the seam coincident with the plane of the beam. A gimbal beneath cover 51 provides X, Y, A, and B adjustment to correctly position the center line of symmetry of the fixture 18 for the 120° C rotation indexing. Clamp unit 53 places the segments in the proper position for welding the segments into the final assembled bit. The keys 58, 59, and 60 maintain the segments in the correct height relationship for the final assembled bit and orient the seams between the segments in the proper position for alignment with the beam. The chuck jaws 54, 55 and 56 contact the segments. A ring gage 57 is positioned around the cones of the segments contacting the gage surfaces of the cones to insure that the final assembled bit will have the proper gage size.

Figure 4:
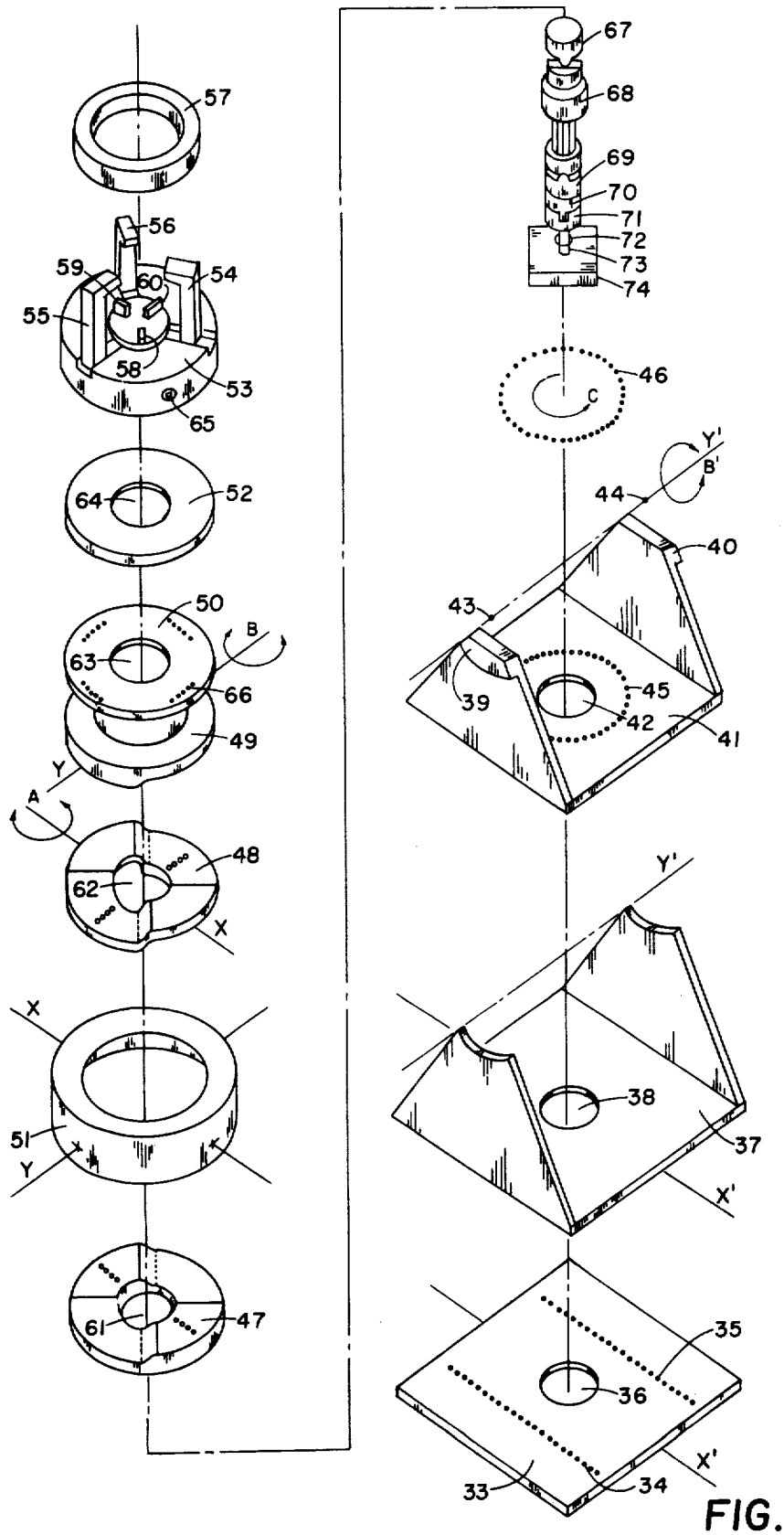
FIG. 4 is an exploded view of the positioning fixture shown in FIG. 3.

Referring now to FIG. 4, an exploded view of the positioning fixture 18 is shown to illustrate the movement and function of the various parts. Bearings 34 and 35 are provided on the fixture base to allow the swing support 37 to move along the X' axis relative to the fixture base 33. A hole 36 in the fixture base 33 allows the indexing drive element for the C rotation indexing to extend through the fixture base 33. The swing 41 is mounted in the swing support 37. The swing 41 rotates about points 43 and 44 providing B' rotation. Protruding curved hinge elements 39 and 40 fit within concave recesses on swing support 37. The radius of the curves of hinge elements 39 and 40 is just sufficient to insure that swing 41 will rotate about points 43 and 44.

A hole 42 in the swing 41 receives the indexing drive element for the C rotation indexing. Bearings 45 and 46 allow the upper portion of the fixture 18 to rotate relative to the swing 41 to accomplish the C rotation indexing. The lower gimbal base 47 is connected to the indexing drive. A hole 61 extends through lower gimbal base 47. A middle gimbal 48 provides adjustment along the X axis and rotation adjustment A. A hole 62 extends through the middle gimbal 48. The top gimbal 49 provides adjustment along the Y axis and rotation adjustment B. A cover 51 is attached to the gimbal base 47 and positioned over middle gimbal 48 and top gimbal 49. A spacer 50 includes bearings 66 to allow the stage 52 a slight amount of $C_1$ rotation for alignment adjustments. The spacer 50 includes a hole 63 and stage 52 has a central opening 64. The clamp unit 53 is mounted on the stage 52. The clamp unit 53 includes movable jaws 54, 55 and 56 that move radially on clamp unit 53. Rotation screw 65 moves the jaws 54, 55 and 56 inward to contact the segments of the bit. Keys 58, 59 and 60 insure that the segments will be properly positioned in the clamp unit 53. The ring gage 57 is positioned over the segments and contacts the gage surface on the cones.

Figure 5:
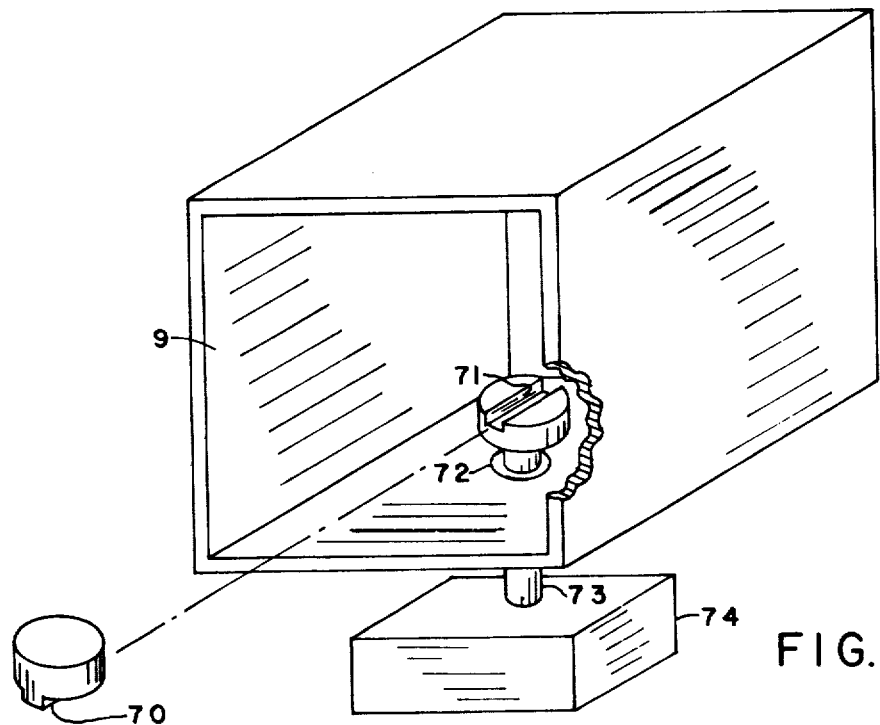
FIG. 5 shows the welding chamber of the welding system shown in FIG. 1.

The indexing drive is shown and illustrated in FIGS. 4 and 5. A universal joint 67 is attached to the lower gimbal base 47. A spline connection 68 extends between universal joint 67 and a universal joint 69. The universal joint 69 is connected to a key element 70. The key element 70 fits within a keyway element 71. The keyway element 71 is attached to a shaft 73. A seal 72 surrounds shaft 73. Shaft 73 is connected to a 120° indexing drive unit 74. The indexing drive unit 74 is conventional; for example, it may be an indexing drive manufactured by Commercial Cam and Machine Co., 400 North Ashland Avenue, Chicago, Illinois 60622 or by Ferguson Machine Co., 11820 Lackland Road, St. Louis, Missouri 63141. As shown in FIG. 5, the shaft 73 extends through the floor of welding chamber 9 and seal 72 provides an air tight seal around shaft 73. The keyway element 71 is positioned above the floor of the weld chamber 9 and receives the key element 70 when the positioning fixture is moved into the weld chamber 9.

The structural details of a positioning fixture for welding rotary rock bits having been described, the welding operation will now be considered. Three individual segments are removed from the conveyor 16 and mounted in the positioning fixture 18 at the assembly station. A groove in the pin end 29 of the segments is positioned over the keys 58, 59 and 60. The chuck jaws 54, 55 and 56 contact flats 22, 23 and 24 machined on the segments 19, 20 and 21. The screw 65 is rotated forcing the segments 19, 20 and 21 together and into the proper position for the final assembled bit. The ring gage 57 is positioned over the cone cutters 25, 26 and 27 and the cone cutters 25, 26 and 27 are moved into contact with the ring gage to insure that the final assembled bit will have the proper gage size. Shims are not used to size the bit to the proper gage size. Instead of using dowels to position the segments 19, 20 and 21, the segments 19, 20 and 21 are moved relative to one another to bring the bit to the proper gage size. The faces between adjacent segments slide relative to one another to bring the cone cutters 25, 26 and 27 into contact with the ring gage 57. For example, the upper proportions of the segments 19, 20 and 21 are moved slightly outward. The faces between the segments are scissored to bring the upper portion of the segments 19, 20 and 21 outward into contact with the ring gage 57.

The dial feed 1 is rotated to bring the positioning fixture 18 to the verification station. The jig transit 8 is used to insure that the plane of the seam 30 is in the proper position for welding and that upon 120° indexing of the clamping unit 53, the next seams will be brought into the proper position for welding. The dial feed 1 is again rotated 120° to bring the positioning fixture 18 to the weld station. The positioning fixture is moved into the weld chamber 9 by the fixture base 33 moving along the Y axis radially outward on the dial feed 1. The chamber 9 is evacuated and the first seam is welded by the beam from the electron beam gun 10 traversing the seam in the plane of the seam. The fixture 18 indexes the clamped segments 120° to bring the next seam into alignment with the beam. After that seam has been welded the clamped segments are indexed 120° to bring the third seam into alignment with the beam. Once the third seam has been welded, the positioning fixture is moved back onto the dial feed 1 and the dial feed 1 is rotated to bring the positioning fixture to the assembly area. The completed bit is removed from the positioning fixture and three new segments may be placed in the positioning fixture to continue the operation.

A further understanding of the welding operation will be obtained by considering the following welding procedure.

Welding Procedure

1. Place a rock bit set master in the fixture.

2. Bring the axis of symmetry of the rock bit set master into a position coincident with the Z axis of the fixture by adjustment of the gimbal. Adjustment of the gimbal will provide A and B rotation and X and Y axis movement.

3. Remove the rock bit set master from the fixture and insert the three segments of the rock bit.

4. Place the ring gage on the segments and bring the gage surface of the cutters into contact with the ring gage to insure that the segments are in the proper position for an accurate gage size bit.

5. If the segments exactly mate, the planes of the seams between the segments will meet to form a line and the line will be coincident with the Z axis. In this case, the plane of one of the seams between segments will be properly aligned with the beam of the electron beam gun and rotation of the fixture (C rotation) 120° will bring the next plane of the seam between two segments into alignment with the beam of the electron beam gun. Additional rotation (C rotation) 120° will bring the next plane of the seam into line with the beam of the electron beam gun.

6. In actual practice, the segments seldom exactly mate to provide the bit with the desired gage size. The segments therefore have to be adjusted with respect to one another to insure that the gage size of the bit is accurate. The prior art rock bits used shims between the separate segments to bring the cutters to the proper gage size. The segments are adjusted according to the present invention by scissoring the segments with respect to one another thereby bringing the gage of the cutters into the proper position for an accurate gage size bit. The pin end of the segments will remain in their original position and the threading of the pin end will be unhampered by uneven connections between segments. The cones will move relative to one another, thereby bringing the gage surfaces of the cones to the proper gage size. The planes of the seams will not meet to form a line. Instead, the plane of the seams will be askew to the Z axis. The axis of symmetry of the bit, however, will remain coincident with the Z axis.

7. In order to bring the plane of the seams into alignment with the beam of the electron beam gun, the swing is rotated to bring the exposed edge of the seam parallel to the plane of the beam. The fixture is rotated ($C_1$ rotation) about the vertical axis (Z axis) to bring the plane of the seam parallel to the plane of the beam. The fixture is then moved laterally (along the X axis) to bring the plane of the seam coincident with the plane of the beam. Once this has been accomplished, indexing of the fixture (C rotation) 120° will bring the plane of the seam between the next two adjacent segments into alignment with the beam of the electron beam gun. Additional rotation of the fixture (C rotation) 120° will bring the last plane of the seam between two segments of the bit into line with the beam of the electron beam gun.

Figure 6:
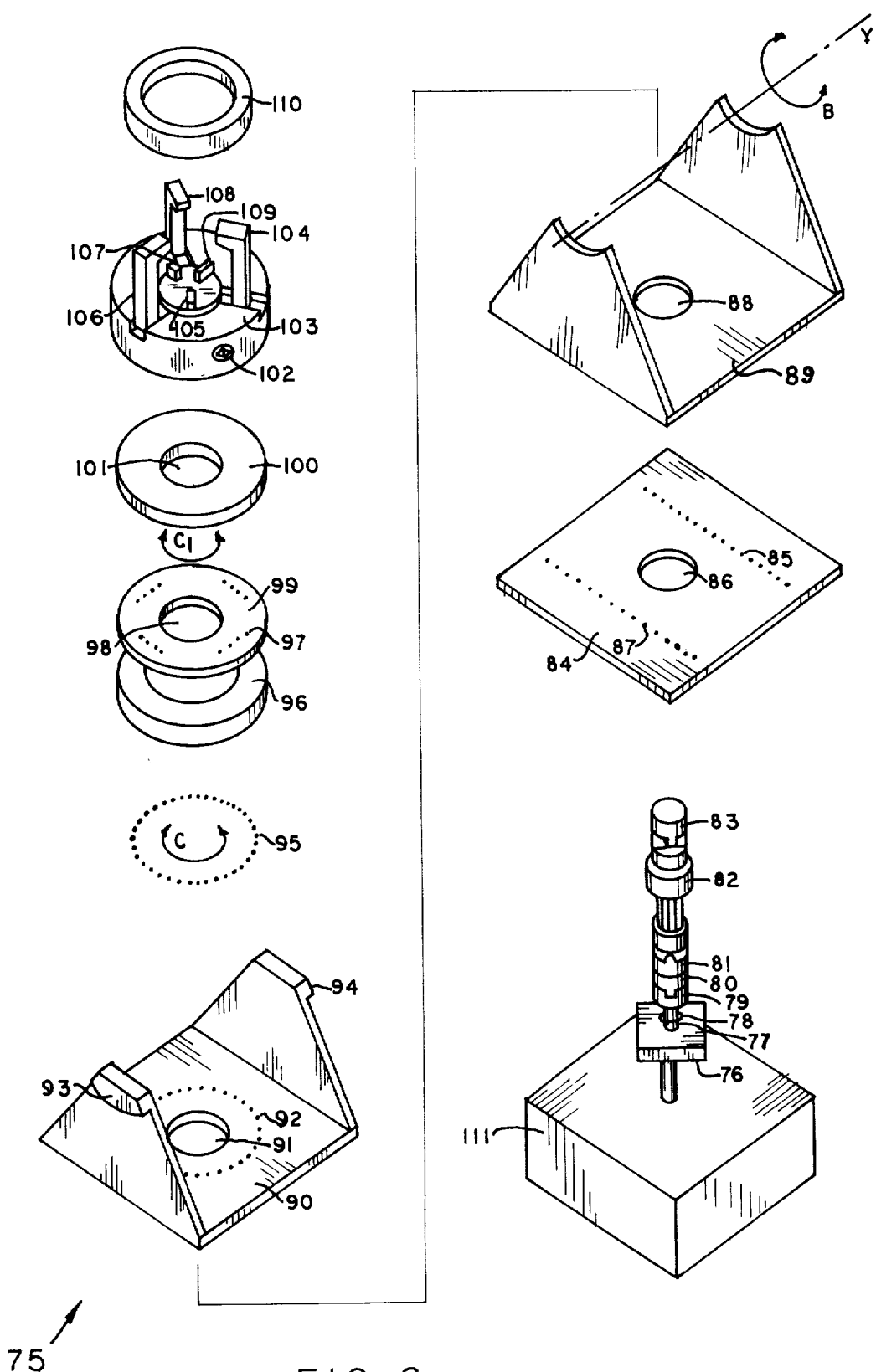
FIG. 6 is an exploded view of another positioning fixture.

Referring now to FIG. 6, an exploded view of another positioning fixture 75 is shown. Bearings 87 and 85 are provided on fixture base 84 to allow swing support 89 to move relative to the fixture base 84 along an X axis perpendicular to the plane established by movement of the beam. A hole 86 in fixture base 84 allows the indexing drive element for the C rotation indexing to extend through fixture base 84. Swing 90 is mounted in the swing support 89. Swing 90 rotates about a Y axis perpendicular to the X axis and the plane of the beam providing B rotation. Protruding curved hinge elements 93 and 94 fit within concave recesses on swing support 89. The radius of the curved hinge elements 93 and 94 is just sufficient to insure that swing 90 will rotate about the Y axis.

A pair of holes 88 and 91 in the swing and a hole 86 in the fixture base 84 allow the indexing drive element to extend through the swing. Bearings 92 and 95 allow the upper portion of the fixture 75 to rotate relative to the swing to accomplish the C rotation indexing. A spacer 96 includes bearings 97 in the top plate 99 to allow the fixture 75 a slight amount of $C_1$ rotation for alignment adjustments. The spacer 96 includes a hole 98; however, the indexing drive element does not extend through the spacer 96. The indexing drive is connected directly to the bottom of spacer 96. Circular plate 100 is positioned over spacer 96. Plate 100 includes a hole 101. A clamp unit 103 is mounted on the plate 100. The clamp unit 103 includes movable jaws 104, 108 and 106 that move radially on clamp unit 103. Rotation of screw 102 moves the jaws 104, 108 and 106 inward into contact with the segments of the bit. Keys 105, 109 and 107 insure that the segments will be properly positioned in the clamp unit 103. A ring sizing element 110 is positioned over the segments and the gage surfaces on the cones are moved into contact with the ring sizing element 110.

The indexing drive is positioned beneath the fixture base 84. A universal joint 83 is connected to the spacer 96. A spline connection 82 extends between the universal joint 83 and a universal joint 81. The universal joint 81 is connected to a key element 80. The key element 80 fits within a keyway element 79. The keyway element 79 is attached to a shaft 77. A seal 78 surrounds the shaft 77. Shaft 77 extends through the floor 76 of the vacuum welding chamber housing. Shaft 77 is connected to a 120° indexing drive unit 111. The indexing drive unit 111 is conventional; for example, it may be an indexing drive manufactured by Commercial Cam and Machine Company, 400 North Ashland Avenue, Chicago, Illinois 60622, or by Ferguson Machine Company, 11820 Lackland Road, St. Louis, Missouri 63141. The shaft 77 extends through the floor 76 of the welding chamber and the seal 78 provides an air tight seal around the shaft 77. The keyway element 79 is positioned above the floor 76 of the weld chamber and receives the key element 80 when the positioning fixture is moved into the weld chamber.

The structural details of a positioning fixture for welding rotary rock bits having been described, the welding operation will now be considered with reference to FIG. 6. Three individual segments are removed from the conveyor and mounted in the positioning fixture at the assembly station. A groove in the pin end of each of the segments is positioned over the keys 105, 109 and 107, respectively. The jaws 104, 108 and 106 contact flats machined on the segments. The screw 102 is rotated forcing the segments together and into the proper position for the final assembled bit. The ring sizing element 110 is positioned over the cone cutters and the cone cutters moved into contact with the ring sizing element 110 to insure that the final assembled bit will have the proper gage size. Shims are not used to size the bit to the proper gage size. Instead the segments are moved relative to one another to bring the bit to the proper gage size. The segments are scissored rotating about the keys 105, 109 and 107. This brings the gage cutting surfaces to the precise desired gage size. All bits manufactured will have this precise gage size. This is contrasted with the prior art bits that were first assembled and then checked with a pair of ring gauges to insure that the gage size fell between the two ring gauges.

The positioning system of the present invention is difficult to explain because it requires three dimensional visualization. It involves indexing three planes (the three weld seams) into the plane generated by movement of the beam. Two centerlines are involved — one is the centerline of the bearing in the fixture about which the parts are indexed 120° — the other is the centerline of symmetry of the rock bit parts. The gimbal of FIG. 4 was provided to adjust the centerline of symmetry to be coincident with the centerline of rotation of the bearing in the fixture. FIG. 6 does not include the gimbal. The coincidence of the centerlines is maintained within tolerable limits by accurately machining pads and keyways on the segments and maintaining jaw alignment.

The exact gage diameter of a rock bit and uniformity of size from bit to bit are very important. The lack of warpage from electron beam welding enables the bit parts to be positioned and clamped, then joined together to form a predetermined, exact size bit. When a difference exists between the predetermined gage diameter and the natural gage diameter (as determined by actual dimension of parts) or the nominal calculated gage diameter, the 120° faces slide to bring the cones inn contact with the ring sizing element. The sliding of the 120° faces results in the three seams being skewed; i.e., the plane of the seams at the apex no longer intersect in a single straight line.

The clamping unit urges the 120° surfaces of the segments into contact and slides them — one against the other — until the cones are stopped against the ring sizing element. If all parts and tooling are perfect, the seams would be coincident with the electron beam. If the seams are out of positional tolerance, the centerline is shifted to bring the seams into register with the beam using radial adjustment $C_1$ tilt adjustment B and left to right adjustment along the X axis. It is important that these adjustments be independent; i.e., the changing of one does not affect the others. To accomplish this, the radial adjustment is about the centerline of the bearing, the tilt adjustment is about a centerline which is perpendicular to the bearing centerline and intersects the bearing centerline at the level of the keys and the left to right adjustment is mutually perpendicular to bearing and tilt centerlines.

The positioning steps will now be described with reference to FIG. 6. It is to be understood that the steps may be performed in various sequences. In order to insure that the plane of the seams will be in alignment with the plane of the beam when the segments are moved into the vacuum chamber, the swing 90 is rotated to bring the exposed edge of a seam parallel to a representation of the plane of the beam. The clamping unit of the fixture is rotated $C_1$ rotation about the vertical axis to bring the plane of the seam parallel to the representation of the plane of the beam. The fixture is then moved laterally (along the X axis) to bring the plane of the seam coincident with the representation of the plane of the beam. Once this has been accomplished indexing of the fixture (C rotation) 120° will sequentially bring the planes of the seams between segments into alignment with the beam of the electron beam gun. The fixture and segments are moved into the vacuum chamber and the segments are fused together along the plane of the first seam. The fixture is indexed and the segments are fused together along the plane of the second seam. Additional rotation of the fixture (C rotation) 120° will bring the plane of the third seam between segments into alignment with the beam. The segments are fused together along the plane of the third seam to complete the three cone bit.

The embodiments of the invention in which an exclusive property or privilege is claimed are defined as follows:

1. A method of positioning segments of a rock bit for alignment with a beam of energy to weld the segments together along the seams between segments by positioning the segments in a welding chamber and sequentially indexing the segments, wherein relative movement between said beam of energy and an individual seam establishes a beam plane, and wherein each seam between adjacent segments establishes a seam plane with an exposed edge, said rock bit having a central axis with said seam plane being out of alignment with said central axis, comprising the steps of:

clamping the segments together in position for the final assembled bit,
tilting said segments about an axis that will be parallel to said beam of energy when the segments are positioned in said welding chamber to bring an exposed edge of a seam plane into a position wherein it would be parallel to said beam plane when positioned in said welding chamber,
rotating said segments about said central axis to bring said seam plane into a position wherein it would be parallel to said beam plane when positioned in said welding chamber, and
moving said clamping means laterally along an axis that is perpendicular to said axis that will be parallel to said beam of energy when the segments are positioned in said welding chamber to bring said beam plane into a position wherein it would be in alignment with said beam plane when positioned in said welding chamber.

2. A method of positioning three separate segments of a rock bit in a position so that the three seams between segments will be in alignment with a beam of energy for welding the segments together along the seams between segments when the segments are positioned in a welding chamber and sequentially indexed, wherein relative movement between said beam of energy and an individual seam establishes a beam plane, and wherein said seams between adjacent segments establishes seam planes, said rock bit having a central axis with said seam planes being out of alignment with said central axis, comprising the steps of:

positioning the segments together in position for the final assembled bit with said seam planes out of alignment with said central axis, tilting said segments about an axis representing an axis that will be parallel to said beam of energy when the segments are positioned in said welding chamber,
rotating said segments about said central axis,
moving said segments laterally along an axis perpendicular to said axis representing an axis that will be parallel to said beam of energy when the segments are positioned in said welding chamber; said tilting, rotating and moving steps functioning to position said segments so that a seam will be aligned with said beam and so that indexing said segments through angular increments corresponding to the number of segments will sequentially bring the seams between segments into alignment with the beam of energy when the segments are positioned in said welding chamber.

3. A method of constructing a three cone rotary rock bit from three individual segments by aligning the three seams between separate segments with a beam of energy inside a vacuum chamber, each of the three segments having faces that contact faces on the adjacent segments, wherein relative movement between said beam of energy and said seams establishes a beam plane and wherein the three seams between adjacent segments establishes three seam planes, said three cone rotary rock bit having a central axis with said three seam planes being out of alignment with said central axis, comprising the steps of:

supporting the segments,
urging the segments together,
tilting said segments,
rotating said segments about said central axis,
moving said segments laterally, said steps of tilting, rotating and moving said segments laterally placing said segments in a position wherein one of said three seam planes will be aligned with said beam plane when said segments are moved into said vacuum chamber and wherein indexing said segments will sequentially bring the other seam planes into alignment with said beam plane,
moving said segments into the vacuum chamber, and
indexing said segments through angular increments corresponding to the number of segments to bring the seams into alignment with said beam plane for fusing the segments together.

4. A method of constructing a three cone rotary rock bit from three individual segments by aligning each seam between adjacent segments with a beam of energy to fuse the segments together wherein relative movement between said beam of energy and an individual seam establishes a beam plane and wherein an individual seam between adjacent segments establishes a seam plane, said rock bit having a central axis with said seam plane being out of alignment with said central axis, comprising the steps of:

clamping the separate segments of said rock bit together in a clamping means with said seam plane being out of alignmnet with said central axis,
tilting said clamping means,
rotating said clamping means, said steps of tilting and rotating adapted to bring said seam plane into a position wherein it would be parallel to said beam plane,
moving said clamping means laterally to bring said seam plane into a position wherein it would be in alignment with said beam plane,
moving said clamping means and said segments into a vacuum chamber,
fusing the segments on each side of the seam together with said beam,
indexing said segments through an angular increment corresponding to the number of segments to bring another individual seam into alignment with said beam plane,
fusing the segments on each side of the seam together with said beam, and
indexing said segments through an angular increment corresponding to the number of segments to bring another individual seam into alignment with said beam plane, and
fusing the segments on each side of the seam together with said beam.

5. A method of positioning three segments of a rock bit in alignment with a beam of energy in a vacuum chamber for welding the segments together along the seams between segments to construct a rock bit, wherein relative movement between said beam of energy and an individual seam establishes a beam plane, wherein said seam between adjacent segments establishes a seam plane, and wherein said positioning aligns the beam plane and the seam plane, said rock bit having a central axis with said seam plane being out of alignment with said central axis, comprising the steps of:

clamping the segments together in position for the final assembled bit thereby forming a composite, tilting said segments, rotating said segments, moving said segments laterally, said steps of tilting, rotating and moving said segments functioning to position said segments so that said beam can be aligned with said seams when said segments are moved into the vacuum chamber, moving said clamping means and the segments into said vacuum cleaner with said seam plane aligned with said beam plane, and indexing said segments by rotating the composite of the three segments through angular increments corresponding to the number of segments to sequentially bring the seams between segments into alignment with the beam of energy.

6. A method of constructing a three cone rotary rock bit from three individual segments by aligning a first seam between adjacent segments with a beam of energy inside a vacuum chamber and subsequently aligning the two additional seam planes with said beam of energy, wherein relative movement between said beam of energy and said seams establishes a beam plane and wherein said first and two additional seams between adjacent segments establishes a first and two additional seam planes, said rock bit having a central axis with said first and two additional seam planes being out of alignment with said central axis, comprising the steps of:

placing the segments in a holding means for holding the separate segments of said rock bit together, said holding means being substantially aligned with a Z axis, with a Y axis being perpendicular to said Z axis and an X axis being perpendicular to both said Z and Y axes, said holding means being adapted to be moved to a position wherein the first seam plane is aligned with said beam plane and indexing said holding means will sequentially bring said two additional seam planes into alignment with said beam plane, said first and two additional seam planes being out of alignment with said Z axis, turning said holding means about said Y axis and rotating said holding means about said Z axis to bring said first seam plane into a position parallel to said beam plane when moved into said vacuum chamber, moving said holding means laterally along said X axis to bring said first seam plane into a position in alignment with said beam plane when moved into said vacuum chamber, moving said holding means into said vacuum chamber with said first seam plane aligned with said beam plane, fusing said segments together throughout said first seam using said beam of energy, indexing the holding means through angular increments corresponding to the number of segments thereby sequentially bringing said two additional seam planes into alignment with said beam plane, and fusing said segments together throughout said two additional seams using said beam of energy.

7. A method of constructing a rock bit from a number of individual segments by aligning the seams between adjacent segments with a beam of energy within a vacuum chamber, wherein relative movement between said beam of energy and an individual seam establishes a beam plate, wherein said seams between adjacent segments establish a multiplicity of seam planes, and wherein a positioning fixture aligns said beam plane and said seam planes, said positioning fixture being adapted to rotate the composite of said segments about a Z axis, with a Y axis being perpendicular to said Z axis and an X axis being perpendicular to both said Z and Y axes, said fixture being adapted to be moved to a position wherein the planes established by said seam planes will be coincident with said beam plane, said seam planes being out of alignment with said Z axis, comprising the steps of:

placing said segments in a holding means for holding the separate segments of said rock bit together, tilting said holding means about said Y axis, rotating said holding means about said Z axis, moving said holding means laterally along said X axis, said tilting, rotating and moving steps functioning to position said segments so that the seams can be aligned with said beam when said holding means and segments are moved into said vacuum chamber, moving said holding means and segments into said vacuum chamber aligning said first seam plane with said beam plane, fusing said segment together along said first seam plane using said beam, indexing said holding means to sequentially move said holding means through angular increments corresponding to the number of segments and bring other seam planes into alignment with said beam plane, and sequentially fusing said segments together along said other seam planes using said beam.

* * * * *